US009405585B2

(12) United States Patent
Chess et al.

(10) Patent No.: US 9,405,585 B2
(45) Date of Patent: Aug. 2, 2016

(54) MANAGEMENT OF HETEROGENEOUS WORKLOADS

(75) Inventors: David Michael Chess, Mohegan Lake, NY (US); Malgorzata Steinder, Fort Lee, NJ (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 1492 days.

(21) Appl. No.: 11/741,875

(22) Filed: Apr. 30, 2007

(65) Prior Publication Data

US 2008/0270199 A1    Oct. 30, 2008

(51) Int. Cl.
*G06Q 10/00* (2012.01)
*G06F 9/50* (2006.01)
*G06Q 10/06* (2012.01)
*G06F 9/455* (2006.01)

(52) U.S. Cl.
CPC .............. *G06F 9/505* (2013.01); *G06F 9/5072* (2013.01); *G06Q 10/06316* (2013.01); *G06F 9/455* (2013.01); *G06F 2209/5017* (2013.01)

(58) Field of Classification Search
CPC ................... G06Q 10/06313; G06Q 10/06315; G06Q 10/6316; G06F 9/5038; G06F 9/455
See application file for complete search history.

(56) References Cited

U.S. PATENT DOCUMENTS

| 5,629,980 | A | * | 5/1997 | Stefik et al. ..................... 705/54 |
| 5,826,239 | A | * | 10/1998 | Du et al. ....................... 705/7.26 |
| 5,870,545 | A | * | 2/1999 | Davis et al. .................... 709/201 |
| 5,890,133 | A | * | 3/1999 | Ernst ............................ 705/7.27 |
| 6,020,895 | A | * | 2/2000 | Azami ................... G06F 3/0481 345/619 |
| 6,615,166 | B1 | * | 9/2003 | Guheen et al. ................... 703/27 |
| 6,751,659 | B1 | * | 6/2004 | Fenger et al. ................. 709/223 |
| 6,801,502 | B1 | | 10/2004 | Rexford et al. |
| 6,950,871 | B1 | * | 9/2005 | Honma et al. ................ 709/226 |
| 7,062,500 | B1 | * | 6/2006 | Hall et al. |
| 7,246,254 | B2 | * | 7/2007 | Alur et al. ......................... 714/2 |
| 7,342,929 | B2 | | 3/2008 | Bremler-Barr et al. |
| 7,356,679 | B1 | * | 4/2008 | Le ..................... G06F 17/30067 707/E17.01 |
| 7,418,523 | B2 | | 8/2008 | Pettyjohn et al. |
| 7,593,928 | B2 | | 9/2009 | Canon et al. |

(Continued)

OTHER PUBLICATIONS

Pacifici Giovanni, 2005, Managing the Response Time of Multi-tiered Web Application, IBM, pp. 1-39.*

(Continued)

*Primary Examiner* — Alan S Miller
*Assistant Examiner* — Stephen S Swartz
(74) *Attorney, Agent, or Firm* — Mercedes L. Hobson; Ryan, Mason & Lewis, LLP

(57) ABSTRACT

Systems and methods for managing a system of heterogeneous workloads are provided. Work that enters the system is separated into a plurality of heterogeneous workloads. A plurality of high-level quality of service goals is gathered. At least one of the plurality of high-level quality of service goals corresponds to each of the plurality of heterogeneous workloads. A plurality of control functions are determined that are provided by virtualizations on one or more containers in which one or more of the plurality of heterogeneous workloads run. An expected utility of a plurality of settings of at least one of the plurality of control functions is determined in response to the plurality of high-level quality of service goals. At least one of the plurality of control functions is exercised in response to the expected utility to effect changes in the behavior of the system.

9 Claims, 10 Drawing Sheets

(56) References Cited

U.S. PATENT DOCUMENTS

| | | | |
|---|---|---|---|
| 7,676,578 B1* | 3/2010 | Zhu et al. | 709/226 |
| 7,870,153 B2 | 1/2011 | Croft et al. | |
| 7,925,973 B2 | 4/2011 | Allaire et al. | |
| 8,042,132 B2 | 10/2011 | Carney et al. | |
| 2002/0188527 A1 | 12/2002 | Dillard et al. | |
| 2004/0003042 A1* | 1/2004 | Horvitz | G06Q 10/109 709/204 |
| 2004/0025157 A1 | 2/2004 | Blight et al. | |
| 2005/0132371 A1* | 6/2005 | Lopez-Estrada | 718/100 |
| 2005/0165643 A1 | 7/2005 | Wilson et al. | |
| 2005/0166233 A1 | 7/2005 | Beyda et al. | |
| 2006/0253471 A1* | 11/2006 | Wasserman et al. | 707/100 |
| 2006/0280119 A1* | 12/2006 | Karamanolis | G06F 9/50 370/229 |
| 2007/0038567 A1 | 2/2007 | Allaire et al. | |
| 2007/0100967 A1 | 5/2007 | Smith et al. | |
| 2007/0156670 A1* | 7/2007 | Lim | 707/4 |
| 2007/0180083 A1 | 8/2007 | Adam et al. | |
| 2007/0180453 A1* | 8/2007 | Burr et al. | 718/105 |
| 2008/0040217 A1 | 2/2008 | Dellovo | |
| 2008/0065974 A1 | 3/2008 | Campbell | |
| 2008/0104605 A1* | 5/2008 | Steinder et al. | 718/104 |
| 2009/0083150 A1 | 3/2009 | Mashinsky | |
| 2009/0132363 A1 | 5/2009 | Powell et al. | |

OTHER PUBLICATIONS

Graupner Sven, Kotov Vadim, Andrezejak Artur, and Trinks Holger, 2002, Control Architecture for Service Grids in a Federation of Utility Data Centers, HP, pp. 1-12.*

Graupner Sven, Kotov Vadim, Andrezejak Artur, and Trinks Holger, 2003, Service-Centric Globally Distributed Computer, HP, IEEE Internet Computing, pp. 36-43.*

Foster Ian, and Tuecke Steven, 2005, The Different Faces of IT as Service, Queue, pp. 27-34.*

Wu Changxun and Burns Randal, 2004, Achieving Performance Consistency in Heterogeneous Clusters, Department of Computer Science Johns Hopkins University.*

Iyer, Ravi, 2004, CQoS: A Framework for Enabling QoS in Shared Caches of CMP Platforms, ICS'04, Jun. 26-Jul. 1, 2004 Saint-Malo, France, pp. 257-266.*

Kawamura Takao, Kinoshita Shin, and Sugahara, Kazunori, 2004, A Mobile Agent Based P2P E-Learning System, Department of Information and Knowledge Engineering, Tottori Univeristy, pp. 873-877.*

Baila Sergi, et al. 2007, Execution Environments for Distributed Computation Issues, pp. 1-162.*

Riedel Christian, Ploeger Andreas, Onnasch GW, Mehdron Hubertus, 1999, Transaction Recording in Medical Image Processing, SPIE Conference on PACS Design and Evaluation: Engineering and Clinical Issues, vol. 3622, pp. 130-137 (hereafter Riedel).*

K. Appleby et al., "Oceano—SLA-Based Management of a Computing Utility," IFIP/IEEE Symposium on Integrated Network Management, May 2001, pp. 1-14, Seattle, WA.

Y. Hamadi, "Continuous Resources Allocation in Internet Data Centers," IEEE/ACM International Symposium on Cluster Computing and the Grid, May 2005, pp. 566-573, UK.

C. Li et al., "Performance Guarantees for Cluster-Based Internet Services," IEEE/ACM International Symposium on Cluster Computing and the Grid, May 2003, 8 pages, Tokyo, Japan.

R. Levy et al., "Performance Management for Cluster-Based Web Services," IEEE Journal on Selected Areas in Communications, Dec. 2005, pp. 247-261, vol. 23, No. 12.

A. Karve et al., "Dynamic Placement for Clustered Web Applications," World Wide Web Conference, May 2006, 10 pages, Edinburgh, Scotland.

D. Feitelson et al., "Parallel Job Scheduling—a Status Report," 10th Workshop on Job Scheduling Strategies for Parallel Processing, 2004, pp. 1-9.

Z. Cao et al., "Utility Max-Min: An Application-Oriented Bandwidth Allocation Scheme," Networking and Telecommunications Group College of Computing, Georgia Institute of Technology, 1999, pp. 793-801.

S. Abdelwahed et al., "Online Control for Self-Management in Computing Systems," Institute for Software Integrated Systems, 2004, pp. 1-8.

V. Cardellini et al., "The State of the Art in Locally Distributed Web-Server Systems," ACM Computing Surveys, vol. 34, No. 2, Jun. 2002, pp. 263-311.

* cited by examiner

|  | JOB1 | JOB2 | JOB3 | JOB4 | JOB5 | JOB6 |
|---|---|---|---|---|---|---|
| Job Type | BLAST | ImageMagick | POV-Ray | BLAST | Lucene | BLAST |
| Exec. time[min] | 15 | 127 | 40 | 8 | 69 | 30 |
| Class | Bronze | Platinum | Platinum | Platinum | Gold | Platinum |
| Max. speed [CPUs] | 2 | 1 | 1 | 2 | 0.6 | 2 |
| Memory [MB] | 550 | 750 | 250 | 550 | 350 | 550 |

FIG. 6

|  | JOB1 | JOB2 | JOB5 |
|---|---|---|---|
| Process files: | | | |
| File number | 286 | 16 | 2693 |
| Disk space [MB] | 614 | 4 | 115 |
| File size [MB]: | | | |
| Image | 6900 | 6900 | 6900 |
| Checkpoint | 550 | 750 | 350 |
| Execution times [s]: | | | |
| Create | 3 | 3 | 3 |
| Boot | 33 | 33 | 32 |
| Create process | 61 | 2 | 79 |
| Suspend | 19 | 21 | 13 |
| Restore | 19 | 21 | 14 |
| Copy checkpoint | 51 | 70 | 35 |
| Copy image | 906 | 904 | 1000 |
| Migrate | 994 | 1016 | 1060 |

FIG. 7

MANAGEMENT OF HETEROGENEOUS WORKLOADS

FIELD OF THE INVENTION

The present invention relates generally to application management, and more particularly, to methods and apparatus for management of heterogeneous workloads

BACKGROUND OF THE INVENTION

Many organizations rely on a heterogeneous set of applications to deliver critical services to their customers and partners. This set of applications includes web workloads typically hosted on a collection of clustered application servers and a back-end tier database. The application mix also includes non-interactive workloads such as portfolio analysis, document indexing, and various types of scientific computations. To efficiently utilize the computing power of their datacenters, organizations allow these heterogeneous workloads to execute on the same set of hardware resources and need a resource management technology to determine the most effective allocation of resources to particular workloads.

A traditional approach to resource management for heterogeneous workloads is to configure resource allocation policies that govern the division of computing power among web and non-interactive workloads based on temporal or resource utilization conditions. With a temporal policy, the resource reservation for web workloads varies between peak and off-peak hours. Resource utilization policies allow non-interactive workload to be executed when resource consumption by web workload falls below a certain threshold. Typically, resource allocation is performed with a granularity of a full server machine, as it is difficult to configure and enforce policies that allow server machines to be shared among workloads. Coarse-grained resource management based on temporal or resource utilization policies has previously been automated. See, K. Appleby et al., "Oceano—SLA-Based Management of a Computing Utility," IFIP/IEEE Symposium on Integrated Network Management, Seattle, Wash., May 2001; and Y. Hamadi, "Continuous Resources Allocation in Internet Data Centers," IEEE/ACM International Symposium on Cluster Computing and the Grid, Cardiff, UK, May 2005, pp. 566-573.

Once server machines are assigned to either the web or the non-interactive workload, existing resource management policies can be used to manage individual web and non-interactive applications. In the case of web workloads, these management techniques involve flow control and dynamic application placement. See, C. Li et al., "Performance Guarantees for Cluster-Based Internet Services," IEEE/ACM International Symposium on Cluster Computing and the Grid, Tokyo, Japan, May 2003; G. Pacifici et al., "Performance Management for Cluster-Based Web Services," IEEE Journal on Selected Areas in Communications, Vol. 23, No. 12, December 2005; and A. Karve et al., "Dynamic Placement for Clustered Web Applications," World Wide Web Conference, Edinburgh, Scotland, May 2006. In the case of non-interactive workloads, the techniques involve job scheduling, which may be performed based on various existing scheduling disciplines. See, D. Feitelson et al., "Parallel Job Scheduling—a Status Report," 10th Workshop on Job Scheduling Strategies for Parallel Processing, 2004, pp. 1-16. To effectively manage heterogeneous workloads, a solution is needed that combines flow control and dynamic placement techniques with job scheduling.

SUMMARY OF THE INVENTION

The embodiments of present invention provide a system and method for management of heterogeneous workloads.

For example, in one aspect of the present invention, a method for managing a system of heterogeneous workloads is provided. Work that enters the system is separated into a plurality of heterogeneous workloads. A plurality of high-level quality of service goals is gathered. At least one of the plurality of high-level quality of service goals corresponds to each of the plurality of heterogeneous workloads. A plurality of control functions are determined that are provided by virtualizations on one or more containers in which one or more of the plurality of heterogeneous workloads run. An expected utility of a plurality of settings of at least one of the plurality of control functions is determined in response to the plurality of high-level quality of service goals. At least one of the plurality of control functions is exercised in response to the expected utility to effect changes in the behavior of the system.

In additional embodiments of the present invention, Web applications are placed on one or more of a plurality of heterogeneous server machines through a placement controller driven by utility functions of allocated CPU demand. Web application requests are received at a request router. The web application requests are dispatched from the request router to one or more web applications on one or more of the plurality of heterogeneous server machines in accordance with a scheduling mechanism. The scheduling mechanism is dynamically adjusted in response to at least one of workload intensity and system configuration. Jobs are allocated to one or more of the plurality of heterogeneous server machines in accordance with placement decisions communicated to a job scheduler by the placement controller.

In another aspect of the present invention, a system for management of heterogeneous workloads comprises a plurality of heterogeneous server machines. The system further comprises a placement controller, driven by utility functions of allocated computer processing unit (CPU) demand, which places web applications on one or more of the plurality of heterogeneous server machines. A request router receives and dispatches requests to one or more web applications on one or more of the plurality of heterogeneous server machines in accordance with a scheduling mechanism. A flow controller in communication with the request router and the placement controller dynamically adjusts the scheduling mechanism in response to at least one of workload intensity and system configuration. A job scheduler allocates jobs to one or more of the plurality of heterogeneous server machines in accordance with placement decisions communicated to the job scheduler by the placement controller.

In additional embodiments of the present invention, the system may also comprise a web application workload profiler that obtains profiles for web application requests in the form of an average number of CPU cycles consumed by requests of a given flow, and provides the profiles for web application requests to the flow controller and placement controller. The system may also comprise a job workload profiler that obtains profiles for jobs in the form of at least one of the number of CPU cycles required to complete the job, the number of threads used by the job, and the maximum CPU speed at which the job may progress, and provides the profiles for jobs to the job scheduler.

In further embodiments of the present invention the system may comprise a plurality of domains in the each of the plurality of heterogeneous server machines. A first domain of the plurality of domains may comprise a node agent in communication with the placement controller and the job scheduler. A second domain of the plurality of domains may comprise a machine agent in communication with the node agent that manages virtual machines inside a given heterogeneous server machine. The node agent provides job management functionality within the heterogeneous server machine through interaction with the machine agent. The machine agent is capable of at least one of creating and configures a virtual machine image for a new domain, copying files from the second domain to another domain, starting a process in another domain, and controlling the mapping of physical resources to virtual resources.

A system is provided that considerably improves the way heterogeneous workloads are managed on a set of heterogeneous server machines using automation mechanisms provided by server virtualization technologies. The system introduces several novel features. First, it allows heterogeneous workloads to be collocated on any server machine, thus reducing the granularity of resource allocation. This is an important aspect for many organizations that rely on a small set of powerful machines to deliver their services, as it allows for a more effective resource allocation when any workload requires a fractional machine allocation to meet its goals. Second, the approach uses high-level performance goals, as opposed to lower-level resource requirements, to drive resource allocation. Hence, unlike previous techniques, which manage virtual machines according to their defined resource requirements, an embodiment of the present invention provides an application-centric view of the system in which a virtual machine is only a tool used to achieve performance objectives. Third, an embodiment of the present invention exploits a range of new automation mechanisms that will also benefit a system with a homogeneous, particularly non-interactive, workload by allowing more effective scheduling of jobs.

BRIEF DESCRIPTION OF THE DRAWINGS

FIG. 6 is a table illustrating jobs used in experiments, according to an embodiment of the present invention;

FIG. 7 is a table illustrating runtime of virtual machine operations for various contained jobs, according to an embodiment of the present invention;

DETAILED DESCRIPTION OF PREFERRED EMBODIMENTS

Integrated automated management of heterogeneous workloads is a challenging problem for several reasons. First, performance goals for different workloads tend to be of different types. For interactive workloads, goals are typically defined in terms of average or percentile response time or throughput over a certain time interval, while performance goals for non-interactive workloads concern the performance of individual jobs. Second, the time scale of management is different. Due to the nature of their performance goals and short duration of individual requests, interactive workloads lend themselves to automation at short control cycles. Non-interactive workloads typically require calculation of a schedule for an extended period of time. Extending the time scale of management requires long-term forecasting of workload intensity and job arrivals, which is a difficult if not impossible problem to solve. Server virtualization assists in avoiding this issue by providing automation mechanisms by which resource allocation may be continuously adjusted to the changing environment. Thus, to collocate applications on a physical resource, one must know the applications' behavior with respect to resource usage and be able to enforce a particular resource allocation decision. For web applications, with the help of an L7 gateway, one can rather easily observe workload characteristics and, taking advantage of similarity of web requests and their large number, derive reasonably accurate short-time predictions regarding the behavior of future requests. Non-interactive jobs do not exhibit the same self-similarity and abundance properties, hence predicting their behavior is much harder. Enforcing a resource allocation decision for web workloads can also be achieved relatively easily by using flow control mechanism. Server virtualization gives us similar enforcement mechanisms for non-interactive applications.

While server virtualization allows for better management of workloads to their respective SLA goals, it also introduces considerable challenges in order to use it effectively. They concern the configuration and maintenance of virtual images, infrastructure requirements to make an effective use of the available automation mechanisms, and the development of algorithmic techniques capable of utilizing the larger number of degrees of freedom introduced by virtualization technologies. Embodiments of the present invention address some of these challenges.

Figure 1:
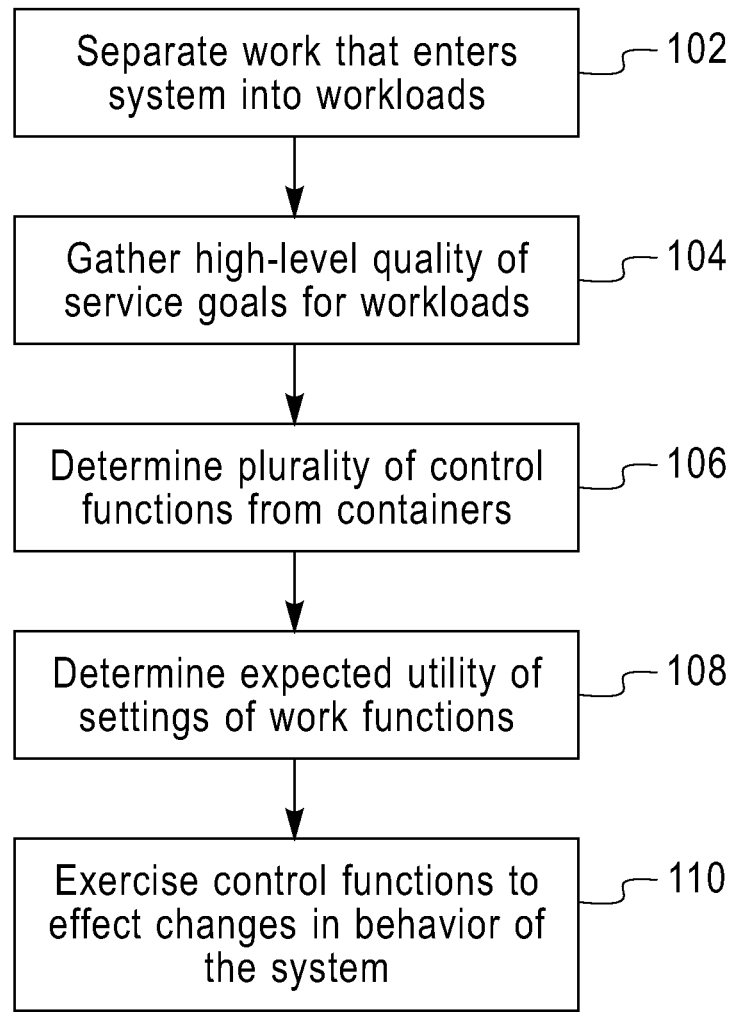
FIG. 1 is a flow diagram illustrating a management methodology for a system of heterogeneous workloads, according to an embodiment of the present invention.

Referring initially to FIG. 1, a flow diagram illustrates a management methodology for a system of heterogeneous workloads, according to an embodiment of the present invention. The methodology begins in block 102, where work that enters the system is separated into a plurality of heterogeneous workloads. In block 104, a plurality of high-level quality of service goals are gathered. At least one of the plurality of high-level quality of service goals corresponds to each of the plurality of heterogeneous workloads. In block 106, a plurality of control functions are determined that are provided by virtualizations on one or more containers in which one or more of the plurality of heterogeneous workloads run. In block 108, an expected utility of a plurality of settings of at least one of the plurality of control functions is determined in response to the plurality of high-level quality of service goals. In block 110, at least one of the plurality of control functions is exercised in response to the expected utility to effect changes in the behavior of the system.

Figure 2:
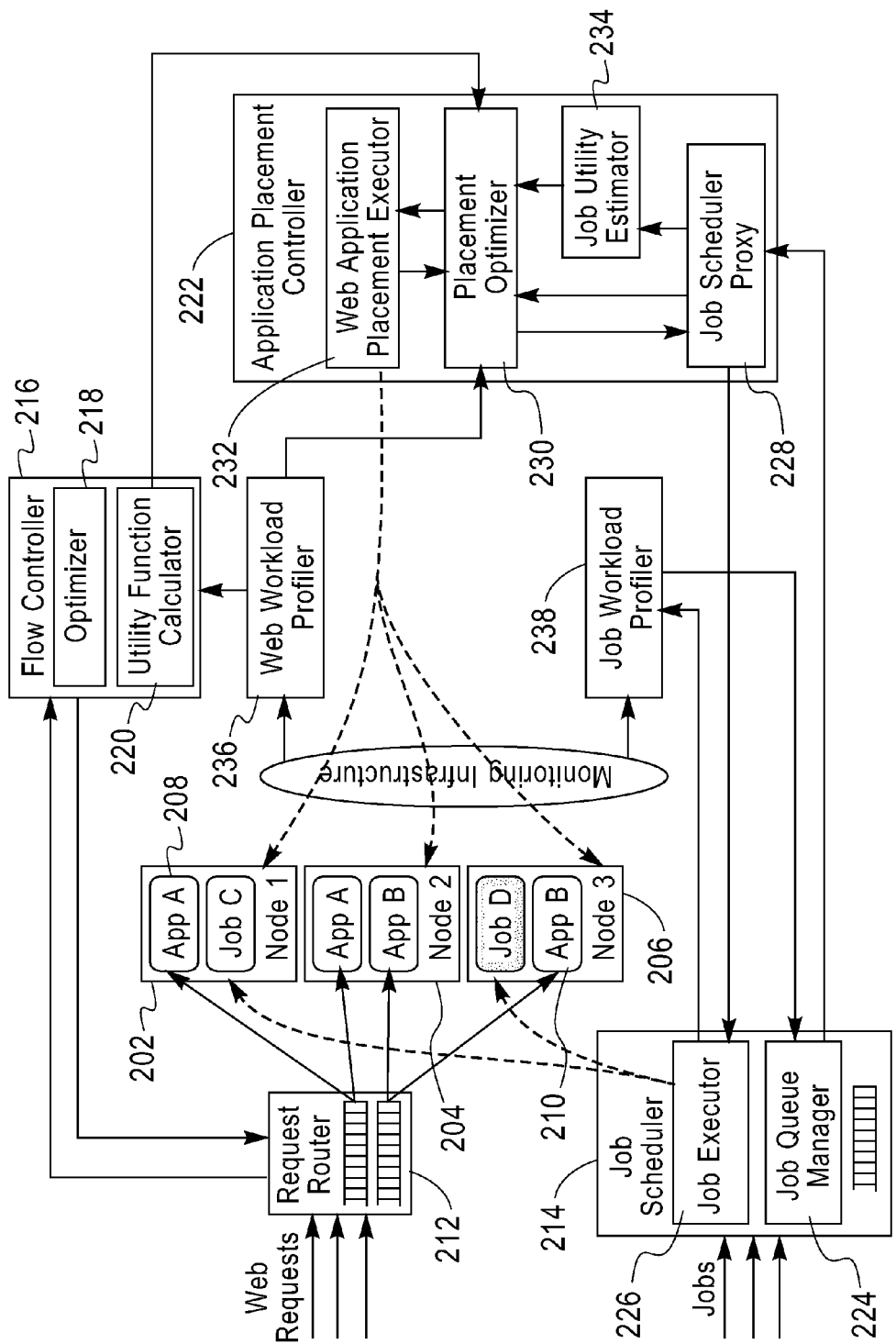
FIG. 2 is a diagram illustrating management system architecture for heterogeneous workloads, according to an embodiment of the present invention.

Referring now to FIG. 2, a diagram illustrates management system architecture, according to an embodiment of the present invention. This system architecture represents one specific example of management system, a plurality of different system architectures that perform the methodology of the present invention as illustrated in FIG. 1 are also possible. The managed system includes a set of heterogeneous server machines, referred to henceforth as node 1 202, node 2 204 and node 3 206. Web applications, app A 208, app B 210, which are served by application servers, are replicated across nodes to form application server clusters. Requests to these applications arrive at an entry request router 212 which may be either an L4 or L7 gateway that distributes requests to clustered applications 208, 210 according to a load balancing mechanism. Long-running jobs are submitted to a job scheduler 214, placed in its queue, and dispatched from the queue based on the resource allocation decisions of the management system.

The management architecture of FIG. 2 takes advantage of an overload protection mechanism that can prevent a web application from utilizing more than the allocated amount of resources. Such overload protection may be achieved using various mechanisms including admission control or OS scheduling techniques. Server virtualization mechanisms could also be applied to enforce resource allocation decisions on interactive applications.

In the system considered, overload protection for interactive workloads is provided by an L7 request router 212 which implements a flow control technique. Router 212 classifies incoming requests into flows depending on their target application and service class, and places them in per-flow queues. Requests are dispatched from the queues based on weighted-fair scheduling discipline, which observes a system-wide concurrency limit. The concurrency limit ensures that all the flows combined do not use more than their allocated re-source share. The weights further divide the allocated resource share among applications and flows.

Both the concurrency limit and scheduling weights are dynamically adjusted by a flow controller 216 in response to changing workload intensity and system configuration. Flow controller 216 builds a model of the system that allows it to predict the performance of the flow for any choice of concurrency limit and weights via optimizer 218. This model may also be used to predict workload performance for a particular allocation of CPU power. The functionality of flow controller 216 is used to come up with a utility function for each web application at utility function calculator 220, which gives a measure of application happiness with a particular allocation of CPU power given its current workload intensity and performance goal.

Long-running jobs are submitted to the system via job scheduler 214, which, unlike traditional schedulers, does not make job execution and placement decisions. In the system, job scheduler 214 only manages dependencies among jobs and performs resource matchmaking. Once dependencies are resolved and a set of eligible nodes is determined, jobs are submitted to an application placement controller (APC) 222 via a job queue manager 224.

Each job has an associated performance goal. An embodiment of the present invention supports completion time goals, but the system may be extended to handle other performance objectives. From this completion time goal an objective function is derived which is a function of actual job completion time. When job completes exactly on schedule, the value of the objective function is zero. Otherwise, the value increases or decreases linearly depending on the distance of completion time from the goal.

Job scheduler 214 uses APC 222 as an adviser to where and when a job should be executed. When APC 222 makes a placement decision, actions pertaining to long-running jobs are returned to job scheduler 214 and put into effect via a job executor component 226. Job executor 226 monitors job status and makes it available to APC 222 for use in subsequent control cycles.

APC 222 provides the decision-making logic that affects placement of both web and non-interactive workloads. To learn about jobs in the system and their current status, APC 222 interacts with job scheduler 214 via a job scheduler proxy 228. A placement optimizer 230 calculates the placement that maximizes the minimum utility across all applications. It is able to allocate CPU and memory to applications based on their CPU and memory requirements, where memory requirement of an application instance is assumed not to depend on the intensity of workload that reaches the instance. The optimization algorithm of APC 222 is improved; its inputs are modified from application CPU demand to a per-application utility function of allocated CPU speed, and the optimization objective is changed from maximizing the total satisfied CPU demand to maximizing the minimum utility across all applications. A web application placement executor 232 places applications on nodes 202, 204, 206 in an optimized manner.

Since APC 222 is driven by utility functions of allocated CPU demand and, for non-interactive workloads, objective functions of achieved completion times are only given, a way to map completion time into CPU demand, and vice versa, may also be provided. Recall that for web traffic a similar mechanism exists, provided by the flow controller. The required mapping is very difficult to obtain for non-interactive workloads, because the performance of a given job is not independent of CPU allocation to other jobs. After all, when not all jobs can simultaneously run in the system, the completion time of a job that is waiting in the queue for other jobs to complete before it may be started depends on how quickly the jobs that were started ahead of it complete, hence it depends on the CPU allocation to other jobs. In the system, simple but effective heuristics are implemented that allow aggregate CPU requirements to be estimated for all long-running jobs for a given value of utility function at job utility estimator 234. This estimation is used to obtain a set of data-points from which the utility function is later extrapolated. This estimation is used to obtain a set of data-points from which values needed to solve the optimization problem are later extrapolated.

To manage web and non-interactive workloads, APC relies on the knowledge of resource consumption by individual requests and jobs. The system includes profilers for both kinds of workloads. A web workload profiler 236 obtains profiles for web requests in the form of the average number of CPU cycles consumed by requests of a given flow. A job workload profiler 238 obtains profiles for jobs in the form of the number of CPU cycles required to complete the job, the number of threads used by the job, and the maximum CPU speed at which the job may progress.

Features of virtualization of which the system in an embodiment of the present invention is capable of taking advantage are briefly enumerated.

PAUSE When a virtual machine is paused, it does not receive any time on the node's processors, but the virtual machine remains in memory.

RESUME Resumption is the opposite of pausing—the virtual machine is once again allocated execution time on the node's processors.

SUSPEND When a virtual machine is suspended, its memory image is saved to disk, and it is unloaded.

RESTORE Restoration is the opposition of suspension—an image of the virtual machine's memory is loaded from disk, and the virtual machine is permitted to run again.

MIGRATE Migration is the process of moving a virtual machine from one node to another. In standard migration, the virtual machine is first paused, then the memory image is transferred across the network to the target node, and the virtual machine is resumed.

LIVE_MIGRATE Live migration is a version of migration in which the virtual machine is paused. Instead, the memory image is transferred over the network whilst the virtual machine runs, and (when the memory images on both nodes match) control passes to the new host.

MOVE_AND_RESTORE When a virtual machine has already been suspended, and needs to be restored on a different node, the management system must first move the saved memory image to the new node, and then restore the virtual machine on the new host node.

RESOURCE_CONTROL Resource control modifies the amounts of various resources that virtual machines can consume, such as, for example, CPU and memory.

While virtualization can be provided using various technologies, an embodiment of the present invention uses Xen as it is capable of providing the wide variety of controls discussed above. Xen is an x86 virtual machine monitor capable of running multiple commodity operating systems on shared hardware. Although it typically requires that guest operating systems be modified, user-level code can execute in guest VMS, called domains, without modification. Xen provides a series of controls, including those discussed above. All of these controls are most directly accessible from a special domain on each Xen-enabled node, labeled domain 0.

The system relies on an entry gateway that provides flow control for web requests. The entry gateway provides a type of high-level virtualization for web requests by dividing CPU capacity of managed nodes among competing flows. Together with an overload protection mechanism, the entry gateway facilitates performance isolation for web applications.

Server virtualization could also be used to provide performance isolation for web applications. This would come with a memory overhead caused by additional copies of the OS that would have to be present on the node. Hence, it is believed that middleware virtualization technology is a better choice for managing the performance of web workloads.

Since middleware virtualization technology can only work for applications whose request-flow it can control, a lower level mechanism must be used to provide performance isolation for other types of applications. As outlined in the previous section, server virtualization provides powerful mechanisms to control resource allocation of non-web applications.

Figure 3:
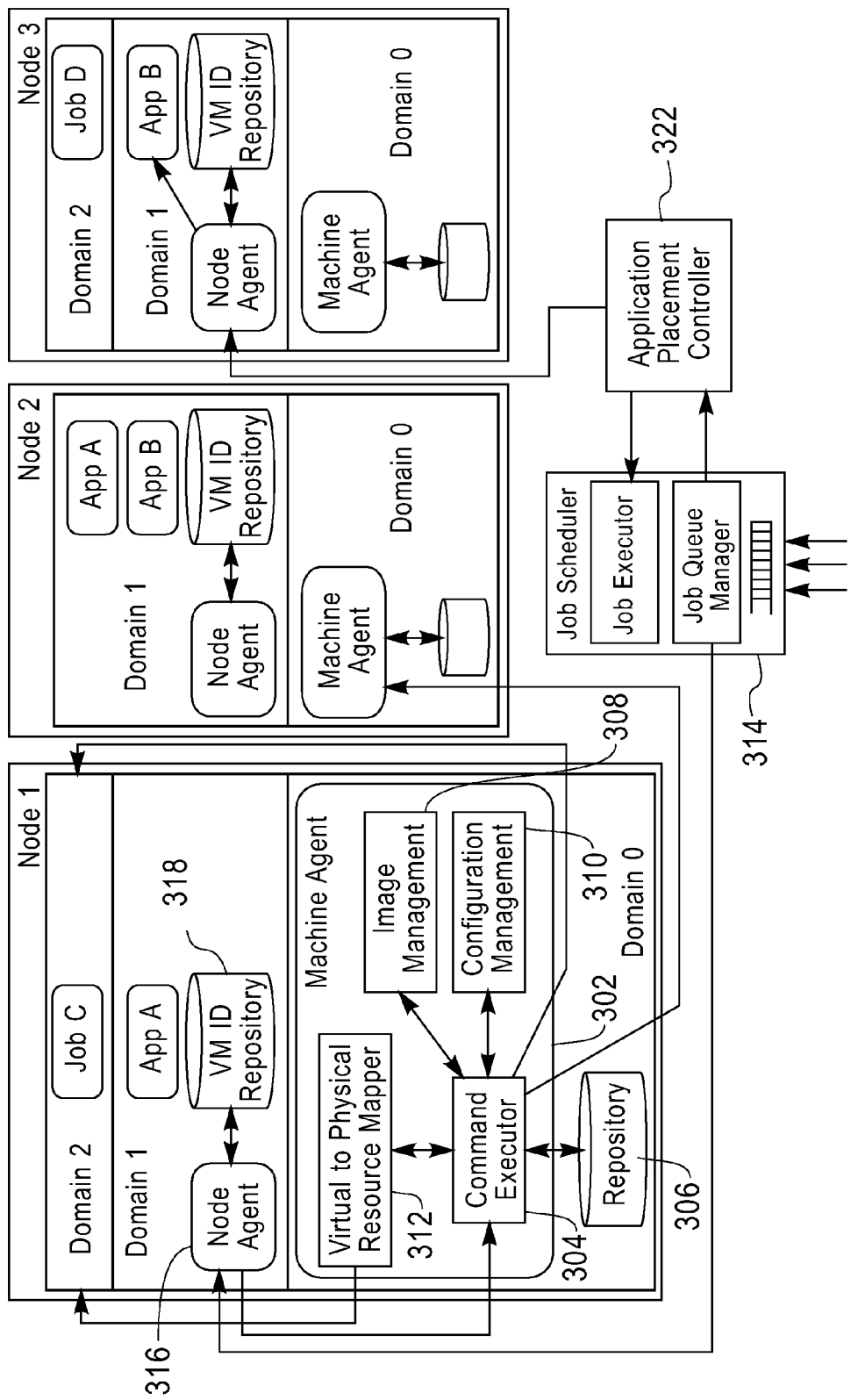
FIG. 3 is a diagram illustrating management architecture for Xen machines, according to an embodiment of the present invention.

Referring now to FIG. 3, a diagram illustrates management architecture for Xen machines, according to an embodiment of the present invention. To manage virtual machines (VMs) inside a physical Xen-enabled node, a component has been implemented, called a machine agent 302, which resides in domain 0 of a given node so as to have access to the Xen domain controls. Machine agent 302 provides a Java-based interface to create and configure a VM image for a new domain, copy files from domain 0 to another domain, start a process in, another domain, and to control the mapping of physical resources to virtual resources.

Xen is used to provide on-line automation for resource management, hence it is desirable to make management actions light-weight and efficient. This consideration concerns the process of creating virtual images, which may be quite time consuming. Substantial delays are avoided, which would otherwise be incurred each time it is intended to start a job from job scheduler 314, by pre-creating a set of images in accordance with a command executor 304 and a repository 306, for use during runtime. The dispensing of these pre-created images is performed by image management subsystem 308. Images once used to run a process are scrubbed of that process data and may be reused by future processes. In small-scale testing thus far, it has been found sufficient to pre-create a small number of images; however, image management subsystem 308 may be extended to dynamically extend the pool of available images if needed.

Inside a created image, a new process may be created. This is done by populating the image with the files necessary to run that new process. In the system, it is assumed that the files required for all processes that may run on the node are placed in its domain 0 in advance. Hence, there is only a need to copy them from domain 0 to the created image. Clearly, there are mechanisms that would allow us to transfer files from an external repository to a node where the process is intended to run.

Before it may be booted, an image must be provided with configuration files to set up its devices and networking. This functionality is encapsulated by a configuration management subsystem 310. To assign an IP address and DNS name, a DHCP server can be used, although in the system a simpler, more restrictive, module has been implemented that selects configuration settings from a pool of available values.

Figure 4:
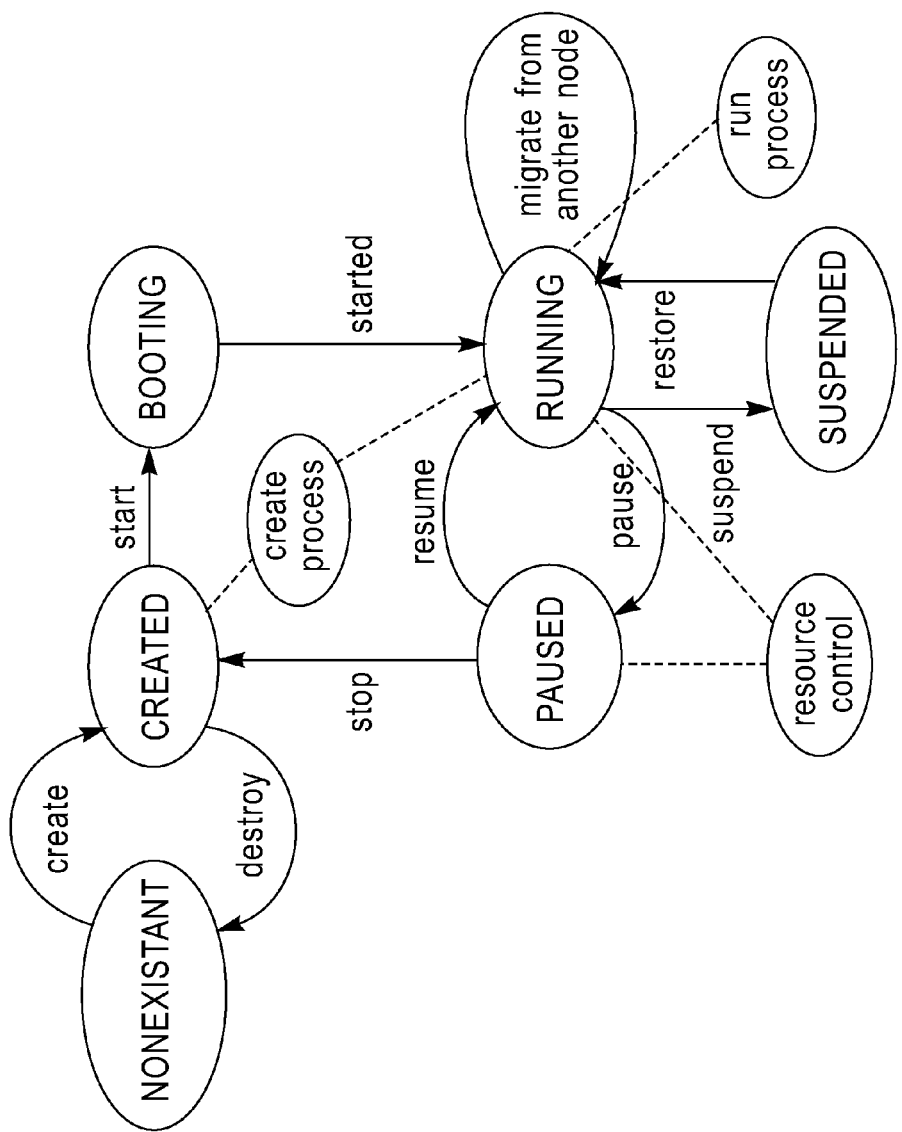
FIG. 4 is a diagram illustrating a life-cycle of a Xen domain, according to an embodiment of the present invention.

Referring now to FIG. 4, a diagram illustrates a life-cycle of a Xen domain, according to an embodiment of the present invention. An image, once configured, may then be booted. Once in the running state, it may be suspended or paused. New processes may be created and run inside it. An image that is either running or paused may also be resource controlled. Migration may be used to transfer the image to another node. A suspend-move-and-restore mechanism has been implemented by which the domain is suspended on one machine, the checkpoint and image files are copied to another node, and the domain is restored on the new host node. This allows us to study the benefits of migration.

Referring again to FIG. 3, Xen provides resource control mechanisms to manage memory and CPU usage by its domains. Memory is set for a domain based on configured or profiled memory requirements. CPU allocation is set for a domain based on autonomic decisions of APC 322, which results from its optimization technique. The CPU allocation to a domain may be lower that the amount of CPU power actually required by a process running inside a domain. Both memory and CPU allocations to a domain may change while the domain is running based on changing process requirements and decisions of APC 322.

CPU allocation to domains may be controlled in Xen using three mechanisms. First, the number of virtual CPUs (vCPUs) can be selected for any VM. Typically, the number of vCPUs depends on the parallelism level of a process that executes inside a domain. Second, vCPUs may be mapped to physical CPUs at a virtual-to-physical resource mapper 312. By 'pinning' vCPUs of a domain to different physical CPUs the performance of the domain may be improved. Finally, CPU time slices may be configured for each domain. When all vCPUs of a domain are mapped to different physical CPUs, allocation of 50 out of 100 time slices to the domain implies that each vCPU of the domain will receive 50% of the compute power of the physical CPU to which it is mapped. Xen also permits borrowing, by which CPU slices allocated to a domain that does not need them can instead be used by other domains.

In a default configuration provided by Xen, each domain receives the same number of vCPUs as there are physical CPUs on a machine. Each of those vCPUs will be mapped to a different physical CPU and receives 0 time slices with CPU borrowing turned on. In the process of managing the system this allocation is modified inside virtual-to-physical resource mapper 312. When a domain is first started, Xen is allowed to create the default number of vCPUs and map them to different physical CPUs. Only the number of time slices is set to obtain the CPU allocation requested by placement controller. While domain is running, its actual CPU usage is observed. If it turns out that the domain is not able to utilize all vCPUs it has been given, it may be concluded that the job is not multi-threaded. Hence, to receive its allocated CPU share, its vCPUs must be appropriately reduced and remapped. Virtual-to-physical resource mapper 312 must attempt to find a mapping that provides the domain with the required amount of CPU power spread across the number of vCPUs that the job in the domain can use-clearly, this is not always possible.

All the VM actions provided by the machine agent are asynchronous JMX calls. They are followed by JMX notifications indicating the completion of an action.

To hide the usage of VMs from a user, a higher-layer of abstraction is implemented, embedded inside a node agent 316, which provides the job management functionality. It provides operations to start, pause, resume, suspend, restore, and resource control a job. To implement these operations, the node agent interacts with command executor 304 of machine agent 302 in domain 0 using its VM management interfaces. When a job is first started, node agent 310 creates (or obtains a pre-created) image in which to run the job. It records the mapping between the job ID and VM ID in a VM ID repository 318. Then it asks machine agent 302 to copy corresponding process binaries to the new image and to boot the image. Once domain is running, the job is started inside it.

Observe that a job is placed in its own domain. This provides performance isolation among jobs such that their individual resource usage is controlled, but it comes at the expense of added memory overhead. The system maybe extended such that it allows collocation of multiple jobs inside a single domain based on some policies.

The node agent process is placed in domain 1, which is the domain used for all web applications. There are two reasons for placing the node agent in a separate domain than domain 0. First, the application server middleware already provides a node agent process with all required management support, thus adding new functionality is a matter of a simple plug-in. Second, domain 0 is intended to remain small and lightweight. Hence, using it to run functionality that does not directly invoke VM management tools is avoided.

Like the machine agent, the node agent exposes its API using JMX.

In FIG. 3 the organization of a Xen-enabled server machine used in the system is shown. At least two domains are run, domain 0 with machine agent 302, and domain 1 with node agent 316 and all web applications. Since resource control for web applications is provided by request router and flow controller, such collocation of web applications does not affect the ability to provide performance isolation for them. Domains for jobs are created and started on-demand.

Figure 5:
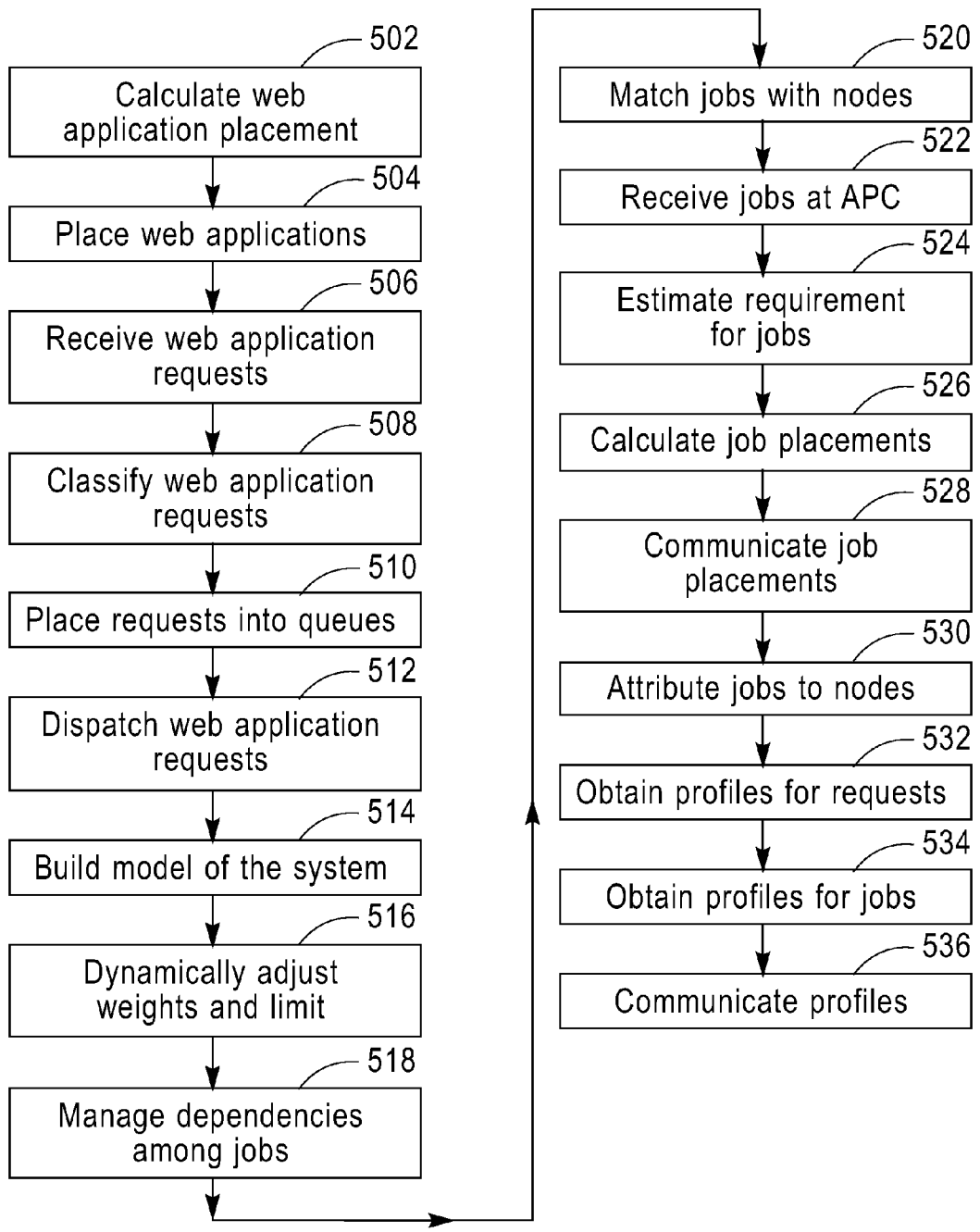
FIG. 5 is a flow diagram illustrating a management methodology for a system of heterogeneous workloads for the system architecture of FIG. 2, according to an embodiment of the present invention.

Referring now to FIG. 5, a flow diagram illustrates a management methodology for a system of heterogeneous workloads in the system architecture of FIG. 2, according to an embodiment of the present invention. The methodology begins in block 502 where a web application placement is calculated that maximizes the minimum utility across all web applications. In block 504, web applications are placed on nodes by a placement controller driven by utility functions of allocated CPU demand. In block 506, web application requests are received at a request router. In block 508, requests are classified into flows at the request router depending on target web application and service class. In block 510, classified requests are placed into per-flow queues within the request router. In block 512, the web application requests are dispatched from the request router to web applications on the nodes in accordance with a weighted-fair scheduling discipline that observes a concurrency limit of the system. In block 514, a model of the system is built that allows a flow controller to predict the performance of a flow for any choice of concurrency limit and weights. In block 516, the weights of the weighted-fair scheduling discipline and the concurrency limit of the system are dynamically adjusted in response to workload intensity and system configuration.

In block 518, dependencies among jobs are managed at a job scheduler. In block 520, jobs are matched with nodes. In block 522, jobs are received from the job scheduler at a job scheduler proxy of the placement controller. In block 524, requirements for jobs for a given value of utility function are estimated at a job utility estimator of the placement controller. In block 526, job placements are calculated that maximizes the minimum utility across all web applications at a placement optimizer of the placement controller. In block 528, the job placements are communicated to the job scheduler through the job scheduler proxy. In block 530, jobs are allocated to the nodes in accordance with placement decisions communicated to a job scheduler by the placement controller.

In block 532, profiles for web application request are obtained in the form of an average number of CPU cycles consumed by requests of a given flow. In block 534, profiles for jobs are obtained in the form of CPU cycles required to complete the job, the number of threads used by the job or the maximum CPU speed at which the job may progress. Finally, in block 536, the profiles for web application request are communicated to the placement controller and the flow controller, and the profiles for jobs are communicated to the job scheduler.

Provided below are examples of experimental evaluations, implementations and integrations, additional implementations for embodiments of the present invention are also possible.

An approach of the present invention is experimentally evaluated using both real system measurements and a simulation. The system in an embodiment of the present invention has been implemented and integrated with WebSphere Extended Deployment application server middleware. WebSphere Extended Deployment is used to provide flow control for web applications and use Xen virtual machines to provide performance isolation for non-interactive workloads.

In the experiments, a single micro-benchmark web application is used that performs some CPU intensive calculation interleaved with sleep times, which simulate backend database access or I/O operations. A set of non-interactive applications is also used, which consists of well known CPU-intensive benchmarks. In particular, BLAST, from The National Center for Biotechnology Information (NCBI), Lucene, from Apache Software Foundation, ImageMagick, and POV-Ray, from Persistence of Vision Pty. Ltd., are used as representative applications for bioinformatics, document indexing, image processing and 3D rendering scenarios respectively. BLAST (Basic Local Alignment Search Tool) is a set of similarity search programs designed to explore all of the available sequence databases for protein or DNA queries. Apache Lucene is a high-performance, full-featured, open-source text search engine library written entirely in Java. In the experiments, the example indexing application provided has been run with the Lucene library to index a large set of files previously deployed in the file system. POV-ray (Persistence of Vision Raytracer) is a high-quality free tool for creating three-dimensional graphics. ImageMagick is a software suite to create, edit, and compose bitmap images.

Referring now to FIG. 6 a table illustrates jobs used in experiments, according to an embodiment of the present invention. In the experiments, six different jobs are submitted, whose properties are shown in FIG. 6. Differentiation of execution time is achieved by choosing different parameters, or by batching multiple invocations of the same application. All used applications except BLAST are single-threaded; hence they can only use one CPU. In addition, Lucene is I/O intensive; hence it cannot utilize a full speed of a CPU. Jobs are assigned to three service classes. Completion time goal for each job is defines relative to its profiled execution time and is equal to 1.5, 3 and 10 for platinum, gold, and silver class, respectively.

The system in an embodiment of the present invention is experimented on a cluster of two physical machines, xd018 and xd020, each with two 3 GHz CPUs and 2 GB memory. The XenSource-provided Xen 3.0.2 packages are used for RedHat Enterprise Linux 4.

While testing, it is determined that the resource control actions of the version of Xen are rather brittle and cause various internal failures across the entire Xen machine. Therefore, in the experiments, resource control actions in the machine agent code are suppressed.

The effectiveness of automation mechanisms used by the system in an embodiment of the present invention may be studied. Three different jobs are taken from the set, JOB1, JOB2, and JOB5, and perform various automation actions on them while measuring their duration. Migration is not measured because it is not set up in the system in an embodiment of the present invention. Instead, move-and-restore is used. Clearly, this is quite an inefficient process, mostly due to the overhead of copying the image. A dramatically different result is expected once live-migration is put in place.

Referring now to FIG. 7, a table illustrates runtime of VM operations for various contained jobs, according to an embodiment of the present invention. The domain creation time includes the time taken to create the domain metadata, such as configuration files. Process creation involves copying process files into process target domain while domain is in running state. Suspend and restore operations involve creating a checkpoint of domain memory and saving it to disk, and restoring domain memory from checkpoint on disk, respectively. The checkpoint copy operation involves transferring checkpoint file between machines in the same LAN. The checkpoint file is practically equal in size to the amount of RAM memory allocated to a domain. Similarly, time to copy an image is measured between two machines in LAN. There is a clear relationship between domain RAM size and its checkpoint copy time, and between domain image size and image copy time. Both copy image and copy checkpoint can be avoided when shared storage is available. Migration time includes suspend, resume, copy image and copy checkpoint, and could be greatly reduced with the use of shared storage.

Figure 8:
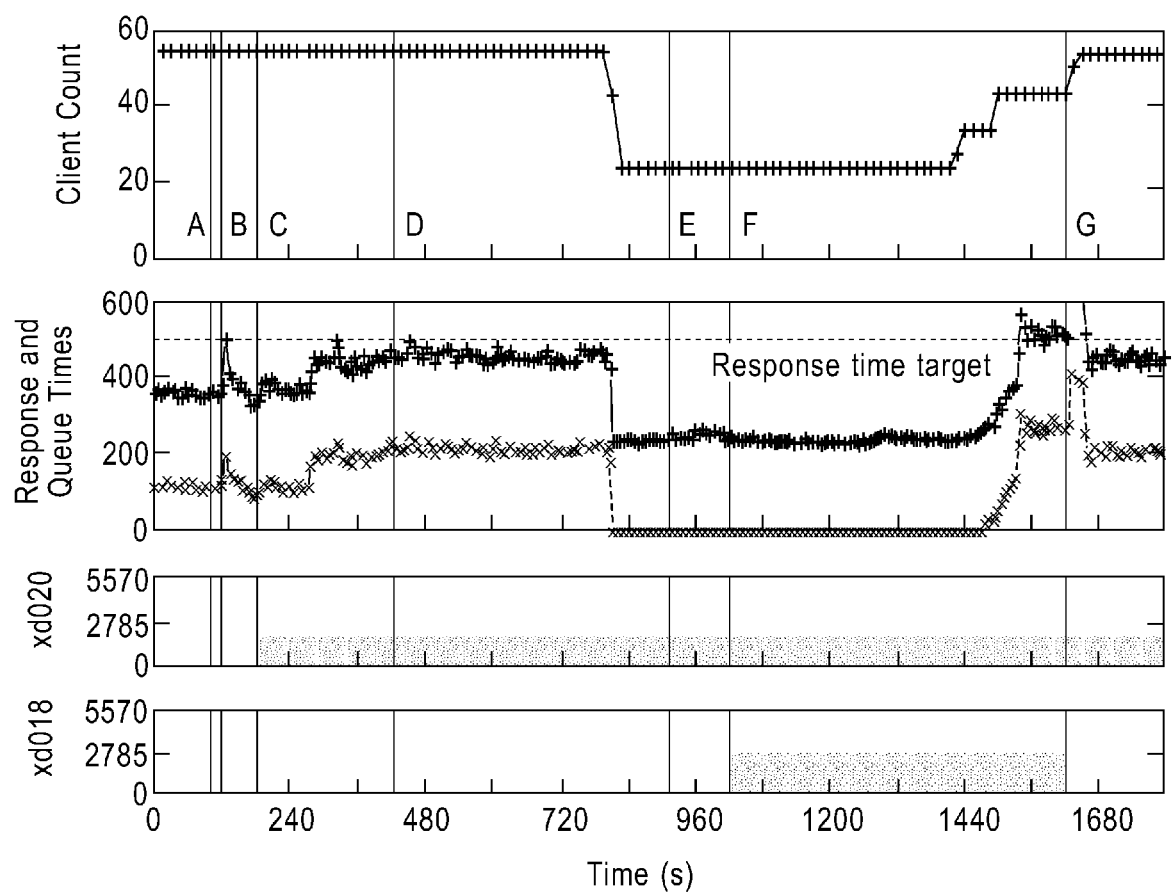
FIG. 8 is a diagram illustrating response time for a web-based transactional test application and job placement on nodes, according to an embodiment of the present invention.

An experiment to demonstrate the benefits of using server virtualization technology in the management of heterogeneous workloads is described. StockTrade (a web-based transactional test application) is deployed in domain on two machines xd018 and xd020. Load to StockTrade is varied using a workload generator that allows for control of the number of client sessions that reach an application. Initially, 55 sessions are started and with this load it is observed that response time of StockTrade requests is about 380 ms and approaches response time goal of 500 ms. Referring now to FIG. 8, a diagram illustrates response time for StockTrade and job placement on nodes, according to an embodiment of the present invention. At this load intensity, StockTrade consumes about 5/6 of CPU power available on both machines. Then JOB5 (A) is submitted. Recall from FIG. 5 that JOB5 is associated with platinum service class and therefore has completion time goal equal to 1.5 to its expected execution time. After a delay caused by the duration placement control cycle (B) and domain starting time, JOB5 is started (C) in domain 2 on xd020 and, in the absence of any resource control mechanism, allocates it the entire requested CPU speed, which is equivalent to 0.6 CPU. As a result of decreased CPU power allocation to domain 1, on xd020, the response time for StockTrade increases to 480 ms, but it stays below the goal. A few minutes after submitting JOB5, JOB1 (D) is submitted, whose service class is bronze. JOB1 has a very relaxed completion time goal but it is very CPU demanding. Starting it now would take 2CPUs from the current StockTrade allocation.

At 800 s since the beginning of the experiment, load is reduced to StockTrade to 25 concurrent client sessions. When CPU usage of StockTrade reduces to about 50% of each machine, the placement controller decides (E) to start JOB1 (F) on xd018. After 1000 s, the number of client sessions is increased back to 55; placement controller suspends JOB1 (G). Typically, JOB1 will later be resumed when any of the following conditions occur: (1) JOB5 completes, (2) load to StockTrade is reduced, or (3) JOB1 gets close enough to its target completion time so as to necessitate its resumption, even at the expense of worsened performance for StockTrade. However, the occurrence of the third condition indicates that the system in an embodiment of the present invention is under-provisioned; hence SLA violation may not be avoided. This simple experiment demonstrates that with the use of server virtualization, the system in an embodiment of the present invention is able to balance resource usage between web and non-interactive workloads.

Figure 9:
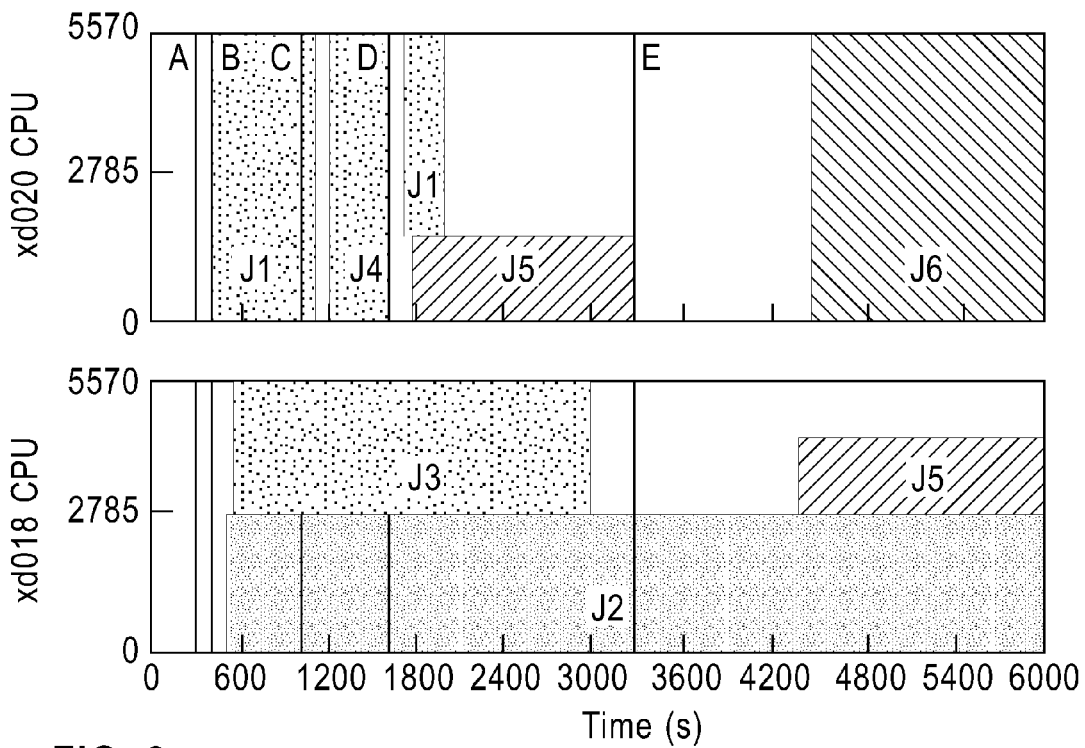
FIG. 9 is a diagram illustrating node utilization by long running jobs, according to an embodiment of the present invention.

The usefulness of server virtualization technology is shown in the management of homogeneous, in this case non-interactive workloads. Using the same experimental set-up as in Section V-B, a test case is run that involves only long-running jobs shown in FIG. 4. Referring now to FIG. 9, a diagram illustrates node utilization by long running jobs, according to an embodiment of the present invention.

The test case is started by submitting JOB1 (A), which is started on xd020 and takes its entire CPU power. Soon after JOB1 is submitted, JOB2 and JOB3 (B) are submitted, which both get started on xd018 and each of them is allocated one CPU on the machine. Ten minutes later, JOB4 (C) is submitted, which has a very strict completion time requirement. In order to meet this requirement, APC decides to suspend JOB1 and start JOB4 in its place. Note that if JOB1 was allowed to complete before JOB4 is allowed to start, JOB4 would wait 5 min in the queue, hence it would complete no earlier than 13 min after its submission time, which would exceed its goal. Instead, JOB4 is started as soon as it arrives and completes within 10 min, which is within its goal. While JOB4 is running, JOB5 (D) is submitted. However, JOB5 belongs to a lower class than any job currently running, and therefore is placed in the queue. When JOB4 completes, JOB5 is started on xd020. Since JOB5 consumes only 1 CPU, APC also resumes JOB1 and allocates it the remaining CPU. However, to avoid Xen stability problems in the presence of resource control mechanisms, the resource control action is suppressed. As a result, resolving competition for CPUs is delegated to Xen hypervisor.

In the next phase of the experiment, the use of migration is demonstrated. After the completion of JOB1 and JOB3, submit JOB6 (E) is submitted. When JOB6 arrives, JOB2 and JOB5 each consume 1 CPU on xd018 and xd020 respectively. Since JOB6 requires 2 CPUs, APC may either (1) make it wait in the queue, (2) suspend JOB2 or JOB5, (3) collocate and resource control JOB6 with either JOB2 or JOB5, or (4) migrate either JOB2 or JOB5. Options (1)-(3) would result in wasted capacity on one or both machines. Moreover, options (1) and (3) would result in having platinum class job receive proportionately less CPU power than JOB5, whose service class is gold. This would clearly not be the optimal decision from the perspective of the optimization objective. Hence, APC decides (E) to move JOB4 to xd018 (which it will now share with JOB5) and start JOB6 on the now-empty xd020.

Even though this experiment shows that APC correctly uses migration when machine fragmentation makes it difficult to place new jobs, it also demonstrates a limitation of the optimization technique, which is currently oblivious to the cost of performing automation actions. Although in this experiment, 15 min is an acceptable price to pay for migrating a job, it is easy to imagine a scenario, where performing such a costly migration would have a damaging effect.

Potential benefits of using virtualization technology in the management of non-interactive workloads are studied. A system is simulated in which jobs with characteristics similar to the ones in Table I are submitted randomly with exponentially distributed inter-arrival times. The workload mix includes 25% multithreaded jobs with execution time of 32 min, 25% multithreaded jobs with execution time of 23 min, 25% single-threaded jobs with execution time of 66 min, 15% single-threaded jobs with execution time of 45 min, and 10% single-threaded jobs with execution time of 127 min. The service class distribution for all jobs is 50%, 40%, and 10% for platinum, gold, and silver service class, respectively. Mean inter-arrival time is varied between 8 and 30 min.

The simulation does not model the cost of performing virtualization actions. Hence, the results concern the theoretical bound on the particular algorithmic technique used.

The placement algorithm (APC) is evaluated with well known scheduling techniques: fast-come-fast-serve (FCFS) and earliest-deadline-first (EDF), in which completion time goal is interpreted as deadline. The placement technique is executed after disabling automation mechanisms provided by virtualization technology (APC_NO_KNOBS).

Figure 10:
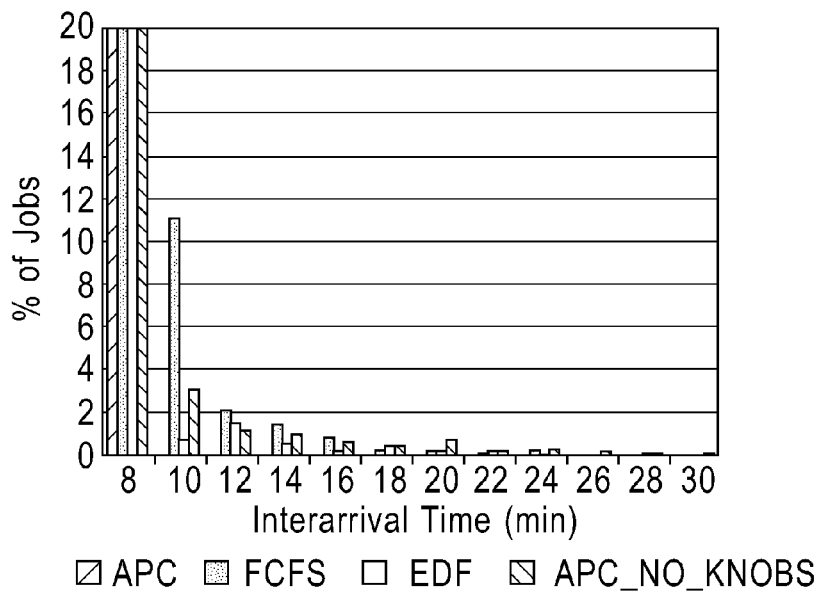
FIG. 10 is a graph illustrating a percentage of jobs that have not met their completion time goal, according to an embodiment of the present invention.

Referring now to FIG. 10, a diagram illustrates a percentage of jobs that have not met their completion time goal as a function of inter-arrival time, according to an embodiment of the present invention. When APC uses virtualization mechanisms, it performs much better than FCFS and EDF. Throughout the experiment, it does not violate any SLAs, with the exception of a high-overload case corresponding to job inter-arrival time of 8 min. In the overloaded system, the technique has 20-30% lower number of missed targets that FCFC and EDF, which is not shown FIG. 10. When virtualization mechanisms are not used, the algorithm is no better or worse than EDF. This shows that the improvement observed in the case of APC is truly due to the use of virtualization technology and not due to new clever scheduling technique.

Figure 11:
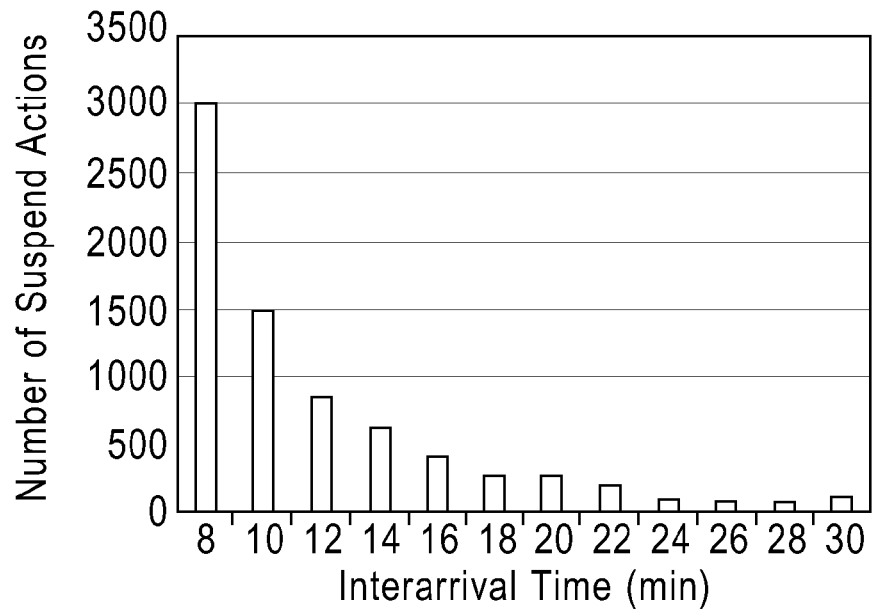
FIG. 11 is a graph illustrating suspend operations, according to an embodiment of the present invention.
Figure 12:
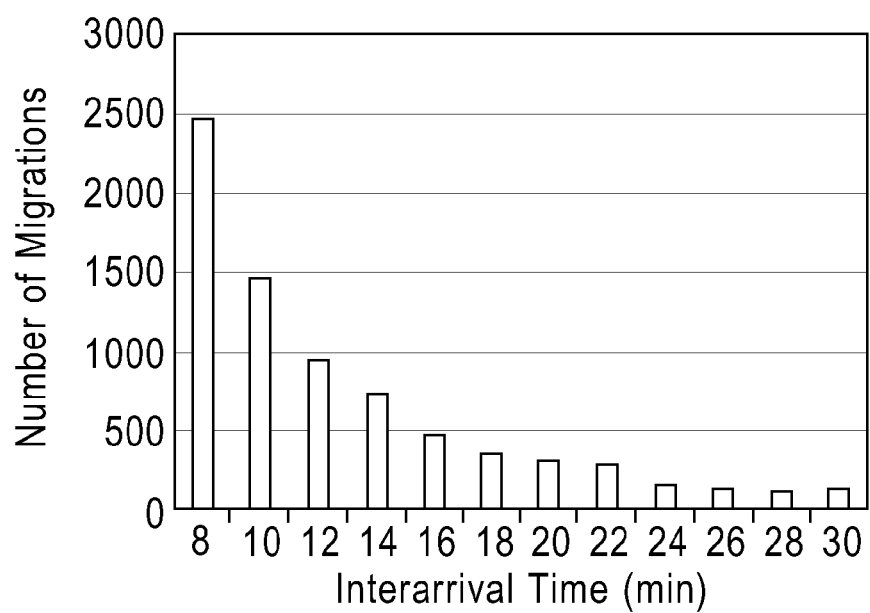
FIG. 12 is a graph illustrating a sum of migrations and move-and-restore actions, according to an embodiment of the present invention.

Referring now to FIG. 11, a diagram illustrates a number of suspend operations, according to an embodiment of the present invention. Referring to FIG. 12, a diagram illustrates a sum of migrations and move-and-restore actions, according to an embodiment of the present invention. Not surprisingly, as load increases, the number of actions also increases. With very high load each job is suspended and moved more than once, which in practice will increase its execution time. In order to benefit from the usage of the automation mechanism in practice, it is therefore important to consider the cost of automation mechanisms in the optimization problem solved by APC. Such costs may be considered.

Figure 13:
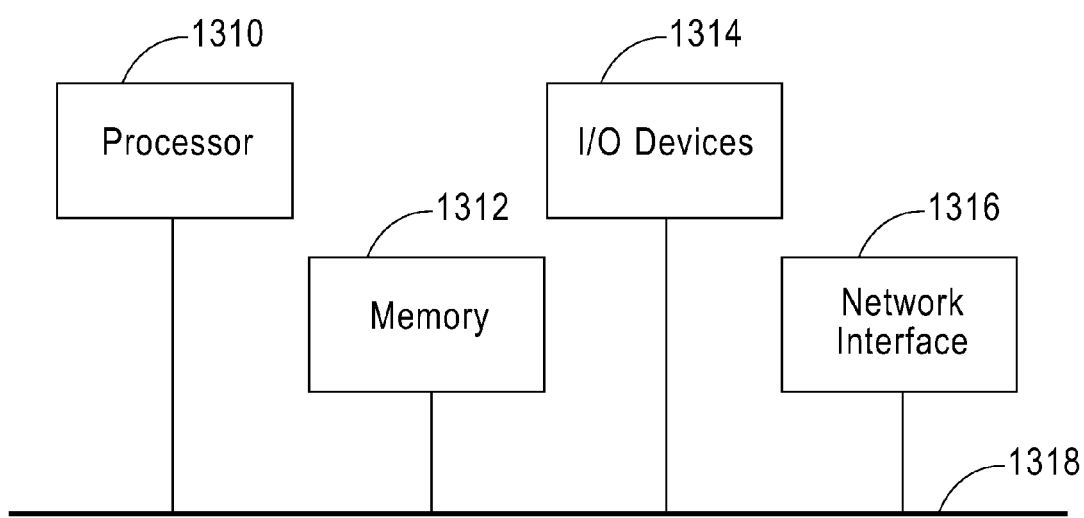
FIG. 13 is a block diagram illustrating an illustrative hardware implementation of a computing system in accordance with which one or more components/methodologies of the invention may be implemented, according to an embodiment of the present invention.

Referring now to FIG. 13, a block diagram illustrates an illustrative hardware implementation of a computing system in accordance with which one or more components/methodologies of the invention (e.g., components/methodologies described in the context of FIGS. 1-5) may be implemented, according to an embodiment of the present invention.

As shown, the computer system may be implemented in accordance with a processor 1310, a memory 1312, I/O devices 1314, and a network interface 1316, coupled via a computer bus 1318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering speech or text into the processing unit, and/or one or more output devices for outputting speech associated with the processing unit. The user input speech and the speech-to-speech translation system output speech may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

While previous techniques concentrate on managing virtual machines as primary abstractions that are exposed to end user, the technique manages applications using automation mechanisms provided by virtual servers. An application-centric approach is taken and the usage of VM technology is kept as invisible to end user as possible.

The system allows management of heterogeneous workloads on a set of heterogeneous server machines using automation mechanisms provided by server virtualization technologies. The system introduces several novel features. First, it allows heterogeneous workloads to be collocated on any server machine, thus reducing the granularity of resource allocation. Second, the approach uses high-level performance goals (as opposed to lower-level resource requirements) to drive resource allocation. Third, the technique exploits a range of new automation mechanisms that will also benefit a system with a homogeneous, particularly non-interactive, workload by allowing more effective scheduling of jobs.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing a system of heterogeneous workloads, comprising the steps of:
    separating work that enters the system into a plurality of heterogeneous workloads, wherein the step of separating work comprises the steps of:
        receiving web application requests at a request router; and
        receiving jobs at a job scheduler;
    gathering a plurality of high-level quality of service goals, wherein at least one of the plurality of high-level quality of service goals corresponds to each of the plurality of heterogeneous workloads, wherein the high-level quality of service goals comprise information regarding at least one of a target application and a service class of the heterogeneous workloads;
    determining a plurality of control functions that are provided by virtualizations on one or more containers in which one or more of the plurality of heterogeneous workloads run, wherein the step of determining a plurality of control functions comprises the steps of:
        placing web applications on one or more of a plurality of heterogeneous server machines;
        dispatching the web application requests from the request router to one or more web applications on one or more of the plurality of heterogeneous server machines in accordance with a scheduling mechanism; and
        managing virtual machines inside a given heterogeneous server machine by a machine agent in a first domain of the given heterogeneous server machine in communication with a node agent in a second domain of the given heterogeneous server machine, wherein:
            the given heterogeneous server machine is a node including each of the machine agent, node agent, first domain and second domain therein;
            the machine agent includes a command executor operatively coupled to the node agent, and the node agent interacts with the command executor of the machine agent to control a job; and
            the command executor is further operatively coupled to an image management subsystem which dispenses pre-created virtual images for use during runtime, and a configuration management subsystem which provides the pre-created virtual images with configuration files prior to booting to set up devices and networking for the pre-created virtual images;
            wherein a process is created in at least one of the pre-created virtual images by populating the pre-created virtual image with process data necessary to run the process; and
            wherein, after the pre-created virtual image is used, the used pre-created virtual image is scrubbed of the process data so that the pre-created virtual image can be reused by a future process;
    determining an expected utility of a plurality of settings of at least one of the plurality of control functions in response to the plurality of high-level quality of service goals;
    exercising at least one of the plurality of control functions in response to the expected utility to effect changes in the behavior of the system, wherein the step of exercising at least one of the one or more control functions comprises the step of dynamically adjusting the scheduling mechanism in response to changing workload intensity and system configuration, and wherein the step of dynamically adjusting the scheduling mechanism comprises the steps of:
        building a model of the system that allows a flow controller to predict performance of a flow for any choice of concurrency limit and weights of a weighted-fair scheduling discipline; and
        dynamically adjusting the weights of the weighted-fair scheduling discipline and the concurrency limit of the system in response to the changing workload intensity and system configuration;
    at least one of suspending or pausing a given pre-created virtual image that is running on the given heterogeneous server machine;
    transferring and copying the suspended or paused pre-created virtual image from the given heterogeneous server machine to another node; and
    restoring or resuming the suspended or paused pre-created virtual image on the other node;
    wherein the steps of separating, gathering, determining a plurality of control functions, determining an expected utility, exercising at least one of the plurality of control functions, suspending or pausing, transferring and copying, and restoring or resuming are executed by a processor device.

2. The method of claim 1, wherein the placing is performed through a placement controller driven by utility functions of allocated CPU demand, and the step of determining a plurality of control functions further comprises the step of:
    attributing jobs to one or more of the plurality of heterogeneous server machines in accordance with placement decisions communicated to a job scheduler by the placement controller.

3. The method of claim 2, wherein the step of placing web applications further comprises the step of calculating a web application placement that maximizes the minimum utility across all web applications.

4. The method of claim 2, wherein the step of dispatching the web application requests comprises the steps of:
    classifying requests into flows at the request router depending on at least one of target web application and service class;
    placing classified requests into per-flow queues within the request router; and
    dispatching requests from the per-flow queues based on a weighted-fair scheduling discipline that observes a concurrency limit of the system.

5. The method of claim 2, wherein the step of attributing jobs comprises the steps of:

managing dependencies among jobs at the job scheduler;

matching jobs with one or more of the plurality of heterogeneous server machines;

receiving jobs from the job scheduler at a job scheduler proxy of the placement controller;

estimating requirements for jobs for a given value of utility function at a job utility estimator of the placement controller;

calculating job placement that maximizes the minimum utility across all web applications at a placement optimizer of the placement controller;

communicating the job placements to the job scheduler through the job scheduler proxy; and attributing jobs to one or more of the plurality of heterogeneous server machines in accordance with the communicated job placements.

6. The method of claim 2, wherein the step of determining one or more control functions further comprises the step of:

providing job management functionality within the heterogeneous server machine through interaction with the machine agent.

7. The method of claim 2, wherein the step of determining an expected utility comprises the steps of:

obtaining profiles for web application requests in the form of an average number of CPU cycles consumed by requests of a given flow;

obtaining profiles for jobs in the form of at least one of the number of CPU cycles required to complete the job, the number of threads used by the job, and the maximum CPU speed at which the job may progress; and communicating the profiles for web application requests to the placement controller and the flow controller, and the profiles for jobs to the job scheduler.

8. Apparatus for managing a system of heterogeneous workloads, comprising:

a memory; and at least one processor coupled to the memory and operative to:

(i) separate work that enters the system into a plurality of heterogeneous workloads, wherein in separating the work, the at least one processor is further operative to: receive web application requests at a request router; and receive jobs at a job scheduler;

(ii) gather a plurality of high-level quality of service goals, wherein at least one of the plurality of high-level quality of service goals corresponds to each of the plurality of heterogeneous workloads, wherein the high-level quality of service goals comprise information regarding at least one of a target application and a service class of the heterogeneous workloads;

(iii) determine a plurality of control functions that are provided by virtualizations on one or more containers in which one or more of the plurality of heterogeneous workloads run, wherein in determining the plurality of control functions, the at least one processor is further operative to: place web applications on one or more of a plurality of heterogeneous server machines; dispatch the web application requests from the request router to one or more web applications on one or more of the plurality of heterogeneous server machines in accordance with a scheduling mechanism; and manage virtual machines inside a given heterogeneous server machine by a machine agent in a first domain of the given heterogeneous server machine in communication with a node agent in a second domain of the given heterogeneous server machine, wherein:

the given heterogeneous server machine is a node including each of the machine agent, node agent, first domain and second domain therein;

the machine agent includes a command executor operatively coupled to the node agent, and the node agent interacts with the command executor of the machine agent to control a job; and the command executor is further operatively coupled to an image management subsystem which dispenses pre-created virtual images for use during runtime, and a configuration management subsystem which provides the pre-created virtual images with configuration files prior to booting to set up devices and networking for the pre-created virtual images;

wherein a process is created in at least one of the pre-created virtual images by populating the pre-created virtual image with process data necessary to run the process; and wherein, after the pre-created virtual image is used, the used pre-created virtual image is scrubbed of the process data so that the pre-created virtual image can be reused by a future process;

(iv) determine an expected utility of a plurality of settings of at least one of the plurality of control functions in response to the plurality of high-level quality of service goals;

(v) exercise at least one of the plurality of control functions in response to the expected utility to effect changes in the behavior of the system, wherein in exercising at least one of the one or more control functions, the at least one processor is further operative to dynamically adjust the scheduling mechanism in response to changing workload intensity and system configuration, and wherein in dynamically adjusting the scheduling mechanism, the at least one processor is further operative to:

build a model of the system that allows a flow controller to predict performance of a flow for any choice of concurrency limit and weights of a weighted-fair scheduling discipline; and dynamically adjust the weights of the weighted-fair scheduling discipline and the concurrency limit of the system in response to the changing workload intensity and system configuration;

(vi) at least one of suspend or pause a given pre-created virtual image that is running on the given heterogeneous server machine;

(vii) transfer and copy the suspended or paused pre-created virtual image from the given heterogeneous server machine to another node; and (viii) restore or resume the suspended or paused pre-created virtual image on the other node.

9. A method for making a computer implemented process to enable management of a system of heterogeneous workloads comprising the steps of:

instantiating first computer instructions onto a computer readable medium, the first computer instructions configured to separate work that enters the system into a plurality of heterogeneous workloads, wherein separating the work comprises:

receiving web application requests at a request router; and receiving jobs at a job scheduler;

instantiating second computer instructions onto a computer readable medium, the second computer instructions configured to gather a plurality of high-level quality of service goals, wherein at least one of the plurality of high-level quality of service goals corresponds to each of the plurality of heterogeneous workloads, wherein the high-level quality of service goals comprise information regarding at least one of a target application and a service class of the heterogeneous workloads;

instantiating third computer instructions onto a computer readable medium, the third computer instructions configured to determine a plurality of control functions that are provided by virtualizations on one or more containers in which one or more of the plurality of heterogeneous workloads run, wherein determining the plurality of control functions comprises: placing web applications on one or more of a plurality of heterogeneous server machines; dispatching the web application requests from the request router to one or more web applications on one or more of the plurality of heterogeneous server machines in accordance with a scheduling mechanism; and managing virtual machines inside a given heterogeneous server machine by a machine agent in a first domain of the given heterogeneous server machine in communication with a node agent in a second domain of the given heterogeneous server machine, wherein:

the given heterogeneous server machine is a node including each of the machine agent, node agent, first domain and second domain therein;

the machine agent includes a command executor operatively coupled to the node agent, and the node agent interacts with the command executor of the machine agent to control a job; and the command executor is further operatively coupled to an image management subsystem which dispenses pre-created virtual images for use during runtime, and a configuration management subsystem which provides the pre-created virtual images with configuration files prior to booting to set up devices and networking for the pre-created virtual images;

wherein a process is created in at least one of the pre-created virtual images by populating the pre-created virtual image with process data necessary to run the process; and wherein, after the pre-created virtual image is used, the used pre-created virtual image is scrubbed of the process data so that the pre-created virtual image can be reused by a future process;

instantiating fourth computer instructions onto a computer readable medium, the fourth computer instructions configured to determine an expected utility of a plurality of settings of at least one of the plurality of control functions in response to the plurality of high-level quality of service goals;

instantiating fifth computer instructions onto a computer readable medium, the fifth computer instructions configured to exercise at least one of the plurality of control functions in response to the expected utility to effect changes in the behavior of the system, wherein exercising at least one of the one or more control functions comprises dynamically adjusting the scheduling mechanism in response to changing workload intensity and system configuration, and wherein dynamically adjusting the scheduling mechanism comprises:

building a model of the system that allows a flow controller to predict performance of a flow for any choice of concurrency limit and weights of a weighted-fair scheduling discipline; and dynamically adjusting the weights of the weighted-fair scheduling discipline and the concurrency limit of the system in response to the changing workload intensity and system configuration;

instantiating sixth computer instructions onto a computer readable medium, the sixth computer instructions configured to at least one of suspend or pause a given pre-created virtual image that is running on the given heterogeneous server machine;

instantiating seventh computer instructions onto a computer readable medium, the seventh computer instructions configured to transfer and copy the suspended or paused pre-created virtual image from the given heterogeneous server machine to another node; and instantiating eighth computer instructions onto a computer readable medium, the eighth computer instructions configured to restore or resume the suspended or paused pre-created virtual image on the other node.

\* \* \* \* \*